(12) United States Patent
Suman

(10) Patent No.: US 10,592,712 B2
(45) Date of Patent: Mar. 17, 2020

(54) COMPACT CAMERA MODULE WITH MULTILEVEL ZOOM AND FOCUS DISTANCE UTILIZING A SWITCHABLE MIRROR

(71) Applicant: Datalogic IP Tech S.R.L., Calderara di Reno (IT)

(72) Inventor: Michele Suman, Ponte san Nicolo (IT)

(73) Assignee: Datalogic IP Tech S.r.l., Calderara di Reno (IT)

( * ) Notice: Subject to any disclaimer, the term of this patent is extended or adjusted under 35 U.S.C. 154(b) by 62 days.

(21) Appl. No.: 15/828,705

(22) Filed: Dec. 1, 2017

(65) Prior Publication Data

US 2019/0171855 A1     Jun. 6, 2019

(51) Int. Cl.
*G06K 7/10* (2006.01)
*G02B 26/12* (2006.01)
*G06K 7/14* (2006.01)

(52) U.S. Cl.
CPC ......... *G06K 7/10831* (2013.01); *G02B 26/12* (2013.01); *G06K 7/10801* (2013.01); *G06K 7/1408* (2013.01)

(58) Field of Classification Search
CPC .......... G06K 7/10801; G06K 7/10811; G06K 7/10831
See application file for complete search history.

(56) References Cited

U.S. PATENT DOCUMENTS

| | | | |
|---|---|---|---|
| 7,748,631 B2 | 7/2010 | Patel et al. | |
| 8,322,621 B2 | 12/2012 | Olmstead | |
| 8,413,902 B2 | 4/2013 | Oliva et al. | |
| 9,754,144 B1 | 9/2017 | Suman | |
| 2004/0118918 A1* | 6/2004 | Dvorkis | G06K 7/0004 235/454 |
| 2010/0155485 A1* | 6/2010 | Tan | G06K 7/10702 235/462.42 |
| 2014/0355974 A1 | 12/2014 | Low et al. | |
| 2017/0011243 A1 | 1/2017 | Hammer | |

* cited by examiner

*Primary Examiner* — Suezu Ellis
(74) *Attorney, Agent, or Firm* — Dentons US LLP

(57) ABSTRACT

One embodiment of a system and method for imaging a scene from a barcode scanner device may include creating a first and second optical paths of the scene, and then causing a switchable mirror disposed along the first and second optical paths to operate in a reflective state and a transparent state. The barcode scanner device may then capture images at different focal distances and with a different field-of-views when the switchable mirror is operating in the reflective state and the transparent state.

19 Claims, 11 Drawing Sheets

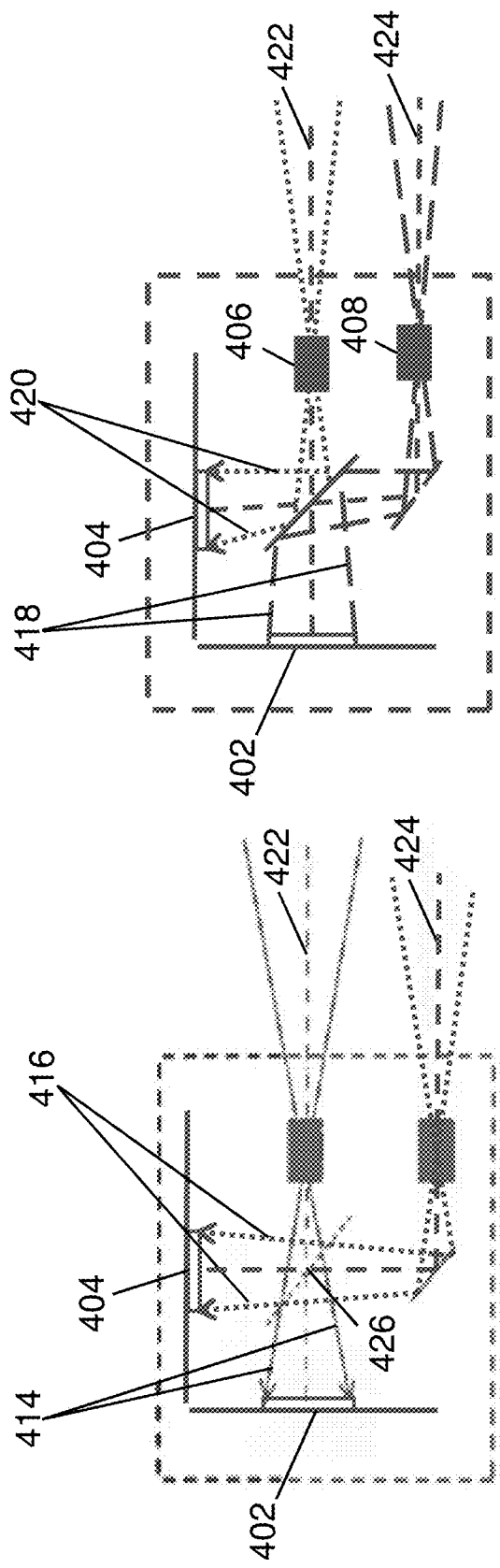

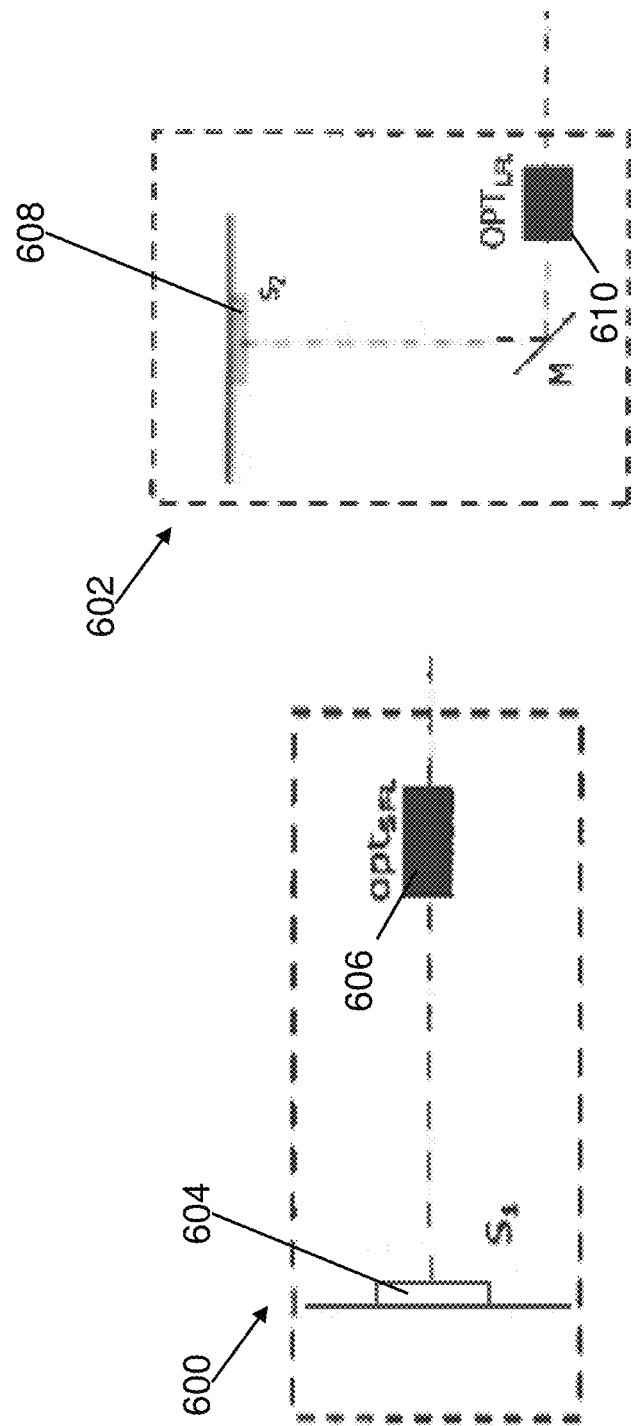

COMPACT CAMERA MODULE WITH MULTILEVEL ZOOM AND FOCUS DISTANCE UTILIZING A SWITCHABLE MIRROR

BACKGROUND

Machine-readable codes, such as barcodes, QR codes, visual features or patterns, and watermarks are representations of information in a visual format. Such codes may include data characters and/or overhead characters represented by a particular sequence of bars and/or spaces that may have varying widths. Such codes have widespread applications. For example, machine-readable codes can be used to identify a class of objects or unique items. As a result, these codes are found on a wide variety of objects, such as documents, retail goods, shipping boxes, product parts, company assets, and so on.

There are several types of data readers used for reading machine-readable codes. The most common types of readers are barcode scanners. In some cases, the barcode scanner moves or scans a laser light beam across the barcode. In some cases, the barcode scanners include solid state image circuitry, such as charge coupled devices (CCD) or complementary metal-oxide semiconductor (CMOS) devices, and may be implemented using a one-dimensional or two-dimensional imaging array of photo sensors or pixels to capture an image of the optical code. One-dimensional CCD readers may capture a linear cross-section of the code to produce an analog waveform whose amplitude represents the relative darkness and lightness of the code. Two-dimensional CCD or CMOS readers may capture an entire two-dimensional image.

FIG. 1A and FIG. 1B illustrate a conventional handheld barcode scanner 100a and a fixed barcode scanner 100b, respectively. In some embodiments, the handheld barcode scanner 100a and/or the fixed barcode scanner 100b may be a direct part marking (DPM) barcode scanner capable of reading barcodes that are etched or imprinted directly into a surface of an object 102. As shown, the handheld barcode scanner 100a has a short focal length and is manually placed very close to the object being scanned, while the fixed barcode scanner 100b has a fixed-length or variable focal length, and is fixedly positioned to scan objects with a fixed distance below the scanner 100b. If a variable focal length, the barcode scanner 100b includes a mechanical zoom camera, as further described herein.

One example of the barcode scanner is a conventional direct part marking (DPM) barcode scanner 200, as illustrated in FIG. 2. Conventional DPM barcode scanner 200 is a two-dimensional scanner equipped with optical components, such as cameras and imagers, which are capable of reading barcodes, such as those that are etched or imprinted directly into a surface of materials of items, such as plastic and metal. The conventional DPM barcode scanner 200 may be a hand-held device or a fixed device. A camera system of the conventional DPM barcode scanner 200 may be configured to capture images of the item. It has been observed that an ability to control a depth-of-field 202 (e.g., shorter than a few feet) of the DPM barcode scanner 200 is limited. Typically, the DPM barcode scanner 200 is designed to have a shorter depth-of-field 202 and fails to work for applications that specify a longer depth-of-field (e.g., longer than a few feet).

In order to improve the ability to control the depth-of-field of the conventional DPM barcode scanner 200, for instance, by having the DPM barcode scanner 200 that is able to work for the applications that specify a variable depth-of-field due to having to scan objects that are both near and far away, a camera system having a zoom function is essential within the DPM barcode scanner 200. A conventional technique to facilitate an ability of the zoom function within the camera system of the DPM barcode scanner 200 typically involves a use of two motor assemblies, such as a starter motor to provide an electric effect and enable the zoom function within the camera system. However, the use of motor-based camera system within the DPM barcode scanner 200 to enable a zoom function has several disadvantages. First, a presence of two large size motors within the camera system of the DPM barcode scanner 200 increases the overall size and weight of the DPM barcode scanner 200. Second, a presence of two small sized motors within the camera system of the DPM barcode scanner 200 makes the DPM barcode scanner 200 unsuitable for several industrial applications. As an example, if the DPM barcode scanner 200 is operated at a very low temperature, such as minus 30 degree Celsius, or a very high temperature, such as plus 70 degree Celsius, small sized motors within the camera system are typically based on a piezoelectric effect, and the piezoelectric effect eventually makes the DPM barcode scanner 200 resistant to operate in both high and low temperatures. Third, a motor-based camera system in the DPM barcode scanner 200 have movable parts, which is problematic because such a camera system of the DPM barcode scanner 200 cannot resist a drop of more than two meters as necessitated for industrial uses.

As understood, the above-described conventional camera-based DPM barcode scanner that are currently available have lower depth-of-field. In order to improve the ability to control the depth-of-field of a DPM barcode scanner, a camera system having a zoom function is essential within the DPM barcode scanner. However, the use of conventional zoom function enabled camera systems within the DPM barcode scanner leads to an increase in the overall size and weight of the DPM barcode scanner, includes problematic movable elements, and increases overall high cost of production due to the requirement of additional components, such as a motor. Therefore, there is a need for an improved camera system to improve an ability to control a depth-of-field eliminate moving parts, and reduce size and weight of a barcode scanner, used to read barcodes on a part or item, as well as provide improved optics for other imaging systems.

SUMMARY

To overcome the shortcomings of conventional DPM barcode scanner systems having short depth-of-field or include a zoom camera with moveable parts, a camera module including a switchable mirror may be utilized in a DPM barcode scanner systems to enable control of the depth-of-field and field-of-view of the DPM barcode scanner systems. A compact direct part marking (DPM) barcode scanner may be equipped with image sensor(s) capable of reading barcodes that are etched or imprinted directly into surfaces of objects. The DPM barcode scanner may include a compact camera module with a multilevel zoom or focus distance by using a switchable mirror.

In an embodiment, a multi-focal distance barcode scanner device may include a multi-focal optical resolution module. The multi-focal optical resolution module may employ a pair of optics components with different focal lengths, a pair of optical sensors (e.g., with different length, width, and/or pixel size formats), and a switchable mirror. Such a multi-focal optical resolution module may enable a microprocessor of the multi-focal distance barcode scanner device to capture images with two different zoom levels or focal distances. The use of the switchable mirror in the multi-focal optical resolution module may enable the barcode scanner device to switch to a different configuration with two different zoom levels or focal distances. Using the multi-focal optical resolution module in the multi-focal distance barcode scanner device with a selectable and switchable zoom function eliminates the need for a zoom function with moving parts. Another feature of the multi-focal optical resolution module in the multi-focal distance barcode scanner device provides for discrete different zoom levels in comparison to the conventional approach of using optics with active moving elements that provide the zoom function.

In an embodiment, an imaging system may include a housing, a plurality of optical components, a plurality of image sensors, and a switchable mirror. The plurality of optical components may be disposed within the housing, and be configured to create first and second optical paths of a scene. The switchable mirror may be disposed along the first and second optical paths. The switchable mirror may be configured to be in a reflective state to cause (i) a first image sensor to capture images at a first focal distance and a first field-of-view, and (ii) a second image sensor to capture images at a second focal distance and second field-of-view. The switchable mirror may be switched to be in a transparent state to cause (iii) the first image sensor to capture images at a third focal distance and third field-of-view and (iv) the second image sensor to capture images at a fourth focal distance and fourth field-of-view.

In an embodiment, a method of imaging a scene may include creating first and second optical paths of the scene. The method may further include causing a switchable mirror disposed along the first and second optical paths to be in a reflective state (i) to capture images at a first focal distance and with a first field-of-view, and (ii) to capture images at a second focal distance and with a second field-of-view. The switchable mirror may be switched to a transparent state (iii) to capture images at a third focal distance and with a third field-of-view and (iv) to capture images at a fourth focal distance and with fourth field-of-view.

In an embodiment, a method of aligning an imaging system may include establishing a first optical path inclusive of at least one first optical component and a first image sensor. The method may include establishing a second optical path inclusive of at least one second optical component and a second image sensor being perpendicularly aligned to the first image sensor, the first and second optical paths crossing perpendicularly prior to being incident the first and second image sensors. The method may further include positioning a center of a switchable mirror at the perpendicular crossing of the first and second optical paths such that (i) when the switchable mirror is in a reflective state, (a) a first optical signal traversing the first optical path is incident the first image sensor and (b) a second optical signal traversing the second optical path is incident the second image sensor, and (ii) when the switchable mirror is in a non-reflective state, (c) the first optical signal traversing the first optical path is incident the second image sensor and (d) the second optical signal traversing the second optical path is incident the first image sensor.

BRIEF DESCRIPTION OF THE DRAWINGS

Illustrative embodiments of the present invention are described in detail below with reference to the attached drawing figures, which are incorporated by reference herein and wherein:

FIG. 4B is an illustration of a transparent state of a switchable mirror of a multi-resolution system of an item processing system, according to an illustrative embodiment;

FIG. 4C is an illustration of an illustrative reflective state of a switchable mirror of a multi-resolution system of an item processing system, according to an illustrative embodiment;

FIG. 6A is an illustration of a composition of a first group of optical components of a multi-resolution system of an item processing system, according to an illustrative embodiment;

FIG. 6B is an illustration of a composition of a second group of optical components of a multi-resolution system of an item processing system, according to an illustrative embodiment;

DETAILED DESCRIPTION OF THE DRAWINGS

The multi-resolution system may employ a pair of optics elements (i.e., two sets of one or more optical components), two optical sensors, and one switchable mirror. The switchable mirror may be disposed at an intersection of both optical paths generated by the pair of optics elements. The optics elements may include one or more lenses having different focal lengths, and be directed to approximately the same scene (e.g., with a slight offset). The switchable mirror may be a transflective mirror that has both a transparent and reflective modes of operation through electric voltage or current (or other control mechanism). For instance, the switchable mirror may be configured to be transformed from a transparent state to a reflective state and vice-versa, and in each state of operation, different optical paths may be generated by the pair of optics elements. Consequently, the configuration and operation of the components of the multi-resolution system may enable a change of a focal length and a zoom function rapidly without having any mechanical and/or movable parts in the multi-resolution system, thereby obtaining four different zoom levels. That is, the multi-resolution system may produce two zoom or depth-of-field function levels per each optics elements and optical sensors by using the switchable mirror.

Figure 1A:
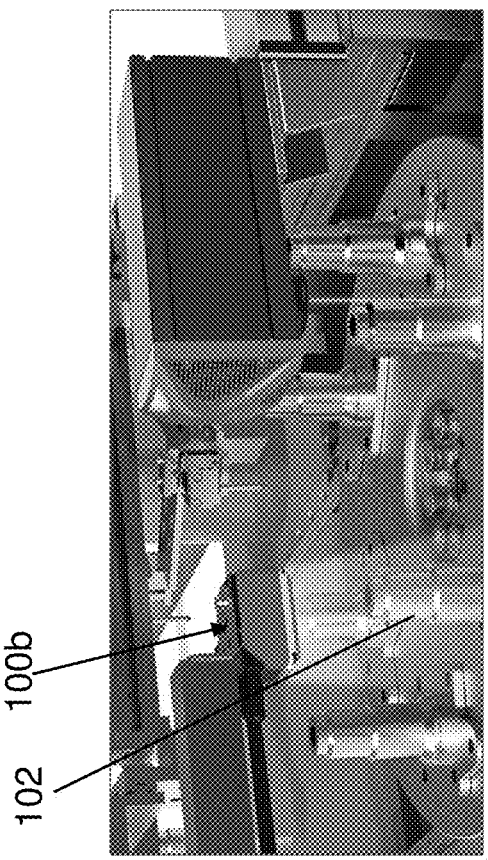
FIG. 1A is an illustration of a conventional handheld barcode scanner.
Figure 1B:
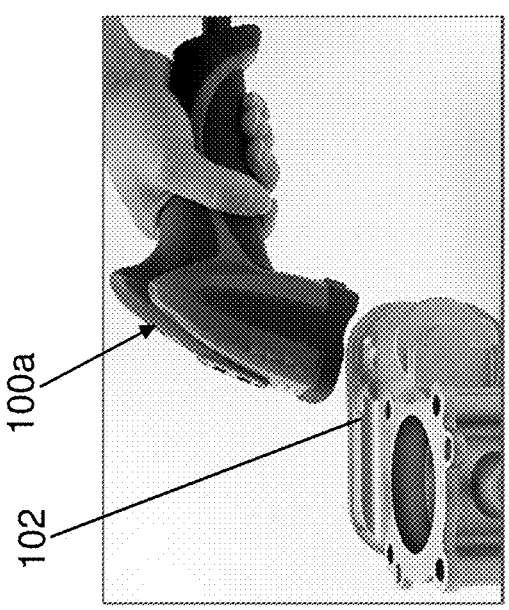
FIG. 1B is an illustration of a conventional fixed barcode scanner.
Figure 3:
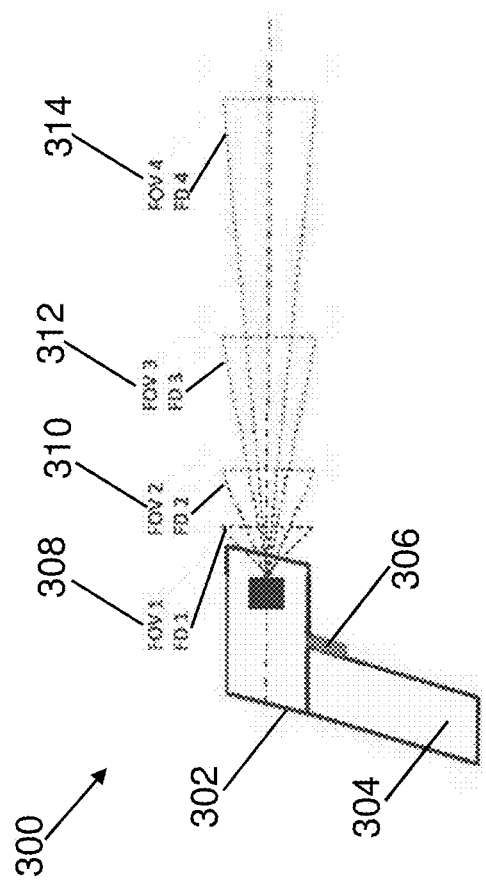
FIG. 3 is an illustration of an item processing system, according to an illustrative embodiment.
Figure 2:
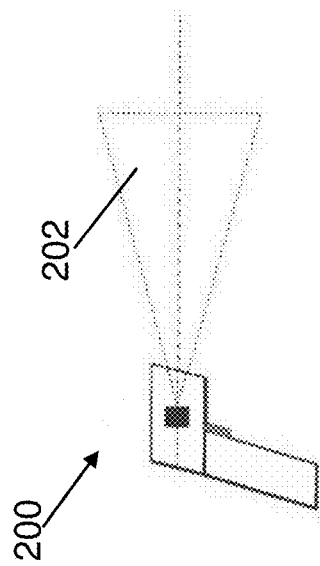
FIG. 2 is an illustration of another conventional barcode scanner device showing a scanning beam for imaging an object in a scene.

FIG. 3 is an illustration of an item processing system 300. The item processing system 300 may be a barcode scanning system or other image processing system, such as a product inspection system configured to have four relative focal distances (FDs) and four respective fields-of-view (FOV). For the purposes of this document, the item processing system 300 may include a scanner that is configured to scan machine-readable indicia, such as barcodes, pin codes, or other configured codes, that are etched or imprinted directly into or onto the surface of materials, such as plastic and metal, as described herein. The item processing system 300 may also be used to scan other printed machine-readable indicia. Still yet, the item processing system 300 may be used to scan or image products to perform image identification.

The item processing system 300 may include a main housing 302 and a handle 304. The handle 304 may include a scan trigger 306. In one embodiment, the main housing 302 has cameras (see FIGS. 4A-4C) located therein, whereby the cameras may capture images of a scene. The cameras may be formed of sets of optics component(s) and optical sensor(s). A light source (not shown) may be located near the cameras to illuminate a scene being captured by the cameras. In an embodiment, the item processing system 300 may also include a touch screen (not shown) on a top or other surface that enables a user to interact with a user interface on the screen to control operation of the item processing system 300 in multiple ways. The screen itself may convey information to the user, such as current settings, current image scanned, a preview of the image to be captured, and previous images. Since the screen may be touch activated, a user may select icons, settings, or other items on the screen to interact with the item processing system 300. Alternative user interfaces may be utilized, as well.

The cameras may be configured to capture images in front of the item processing system 300. Digital images may be produced by image sensors of the cameras. The item processing system 300 may further include a light source that emits light upon an object in the scene while an image of the object is being captured by the cameras. The light source may be integrated within the barcode scanner 300.

In an embodiment, a main housing 302 of the barcode scanner 300 may include optical components, image sensors, and a switchable mirror, where the optical components, image sensors, and switchable mirror are configured to operate in a way to provide optical zoom capability by changing magnification (focal distances and fields-of-view) of images captured from the image sensors without movement of the optical components relative to the image sensors. In order to achieve the optical zoom capability in the barcode scanner 300, a switchable mirror may be utilized in the main housing 302 that is a transflective mirror that has both a transparent mode and a reflective mode of operation. The modes of operation may be selectable by applying an electric voltage or current. The optical components may be installed within the main housing 302, and configured to create multiple optical paths of a scene. The optical components may further be arranged to capture the same scene, and be positioned in a stereoscopic orientation, as further provided herein. The switchable mirror may be disposed within the main housing 302 such that the switchable mirror is positioned at an intersection of the multiple optical paths.

In one mode of operation, the switchable mirror may be configured to be in a reflective mode to cause the image sensors to capture images at multiple focal distances and multiple fields-of-view. In another mode of operation, the switchable mirror may be transformed into a transparent mode from the reflective mode to cause the image sensors to capture images at different multiple focal distances and different multiple fields-of-view with respect to values of the focal distances and the fields-of-view when the switchable mirror was in the reflective mode. The multiple focal distances and the multiple fields-of-view at which the images are captured of a same size object (for example, same barcode) when the switchable mirror is in each of the transparent mode and the reflective mode of operation may include a first focal distance (FD1) and a first field-of-view (FOV1) 308; a second focal distance (FD2) and a second field-of-view (FOV2) 310; a third focal distance (FD3) and a third field-of-view (FOV3) 312; and a fourth focal distance (FD4) and a fourth field-of-view (FOV4) 314. The value of each of the focal distances and fields-of-view 308, 310, 312, and 314 are different from one another, and are based on size, location, relative positions, curvature, and other attributes of each of the optical components, image sensors, and switchable mirror with respect in the main housing 302 of the barcode scanner 300.

Figure 4A:
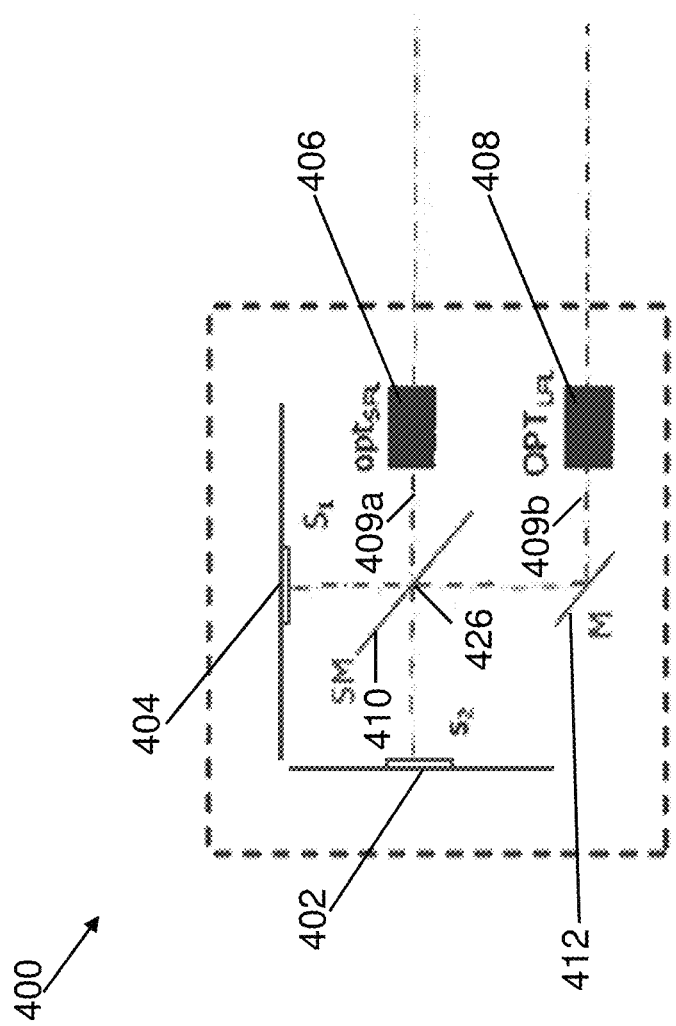
FIG. 4A is an illustration of an architecture of a multi-resolution system of an item processing system, according to an illustrative embodiment.

FIG. 4A is an illustration of an architecture of a multi-resolution system 400 of an item processing system. In some embodiments, the item processing system may be a hand-held barcode scanner device and/or a fixed barcode scanner device. In some embodiments, the item processing system may be a direct part marking (DPM) barcode scanner device equipped with the multi-resolution system 400 capable of reading barcodes that are etched or imprinted directly into the surface of an object.

A main housing of the multi-resolution system 400 may be configured to house a printed circuit board (PCB), and may include a plurality of image sensors, such as a first image sensor ($S_1$) 404 and a second image sensor ($S_2$) 402. Multiple optical components, such as a first optical element ($OPT_{SFL}$) 406 and a second optical element ($OPT_{LFL}$) 408, may be configured to create first and second optical paths 409a and 409b (collectively 409) to capture a scene with an object being read by the item processing system. The first and second optical elements ($OPT_{SFL}$) and ($OPT_{LFL}$) 406 and 408 may each include one or more optical components (e.g., one or more lenses). Cameras of the multi-resolution system 400 may be defined by the optical elements 406 and 408, switchable mirror 410, mirror 412, and image sensors 402 and 404. A switchable mirror (SM) 410 may be configured to operate in both transparent mode and reflective mode of operation, and be disposed at an intersection 412 of the first and second optical paths 409, as further described herein. A mirror 412 may be used to reflect an optical signal along the second optical path 409b created by the optical element 408. The first image sensor ($S_1$) 404 and the second image sensor ($S_2$) 402 disposed on the PCB may have different format sizes, and in the present embodiment, a format size of the first image sensor ($S_1$) 404 may be greater than a format size of the second image sensor ($S_2$) 402. In alternate embodiments, a format size of the first image sensor ($S_1$) 404 may be less than a format size of the second image sensor ($S_2$) 402. The format sizes being different may mean that the length and width of the sensors are different along with pixel sizes being different.

The first optical element ($OPT_{SFL}$) 406 and the second optical element ($OPT_{LFL}$) 408 disposed on the PCB may have different focal lengths, and in the present embodiment, the first optical element (OPT$_{SFL}$) 406 has a shorter focal length and the second optical element (OPT$_{LFL}$) 408 has a longer focal length with respect to focal length of the first optical element (OPT$_{SFL}$) 406. In alternate embodiments, the first optical element (OPT$_{SFL}$) 406 may have a longer focal length and the second optical element (OPT$_{LFL}$) 408 may have a shorter focal length with respect to focal length of the first optical element (OPT$_{SFL}$) 406. In addition, the optical elements may be arranged to be in a stereoscopic configuration to image a scene. Alternatively, the camera may be arranged to be in another, non-stereoscopic configuration. Moreover, although only two optical elements 406 and 408 and one switchable mirror 410 are shown, other numbers of optical elements and switchable mirrors may be utilized using the same or similar configuration, albeit extended to accommodate the additional components (e.g., additional optical element, additional switchable mirror, additional image sensor).

In operation, upon application of an applied voltage (using a controller device mounted on the PCB, for example) to the switchable mirror (SM) 410, which is a two state optical element, the switchable mirror (SM) 410 may operate in a reflective mode or a transparent mode depending on a voltage or current value of the applied driving voltage. Based on the application of the driving voltage on the switchable mirror (SM) 410, when the switchable mirror (SM) 410 operates in a reflective state, as depicted in FIG. 4C, the first image sensor 404 may capture images at a first focal distance with a first field-of-view, and the second image sensor 402 may capture images at a second focal distance with a second field-of-view. Values of the first focal distance and the first field-of-view are different from values of the second focal distance and the second field-of-view, respectively.

Based on the application of the driving voltage on the switchable mirror (SM) 410, when the switchable mirror (SM) 410 operates in a transparent mode, as depicted in FIG. 4B, the first image sensor 404 may capture images at a third focal distance and third field-of-view and the second image sensor 402 may be caused to capture images at a fourth focal distance and forth field-of-view. Values of the third focal distance and the third field-of-view are different from values of the fourth focal distance and fourth field-of-view, respectively. Accordingly, using the described configuration and operation of components of the multi-resolution system 400 of the barcode scanner device, multiple images may be simultaneously captured by the first image sensor (S$_1$) 404 and the second image sensor (S$_2$) 402 with first and second focal distances and fields-of-view. And, by changing the switchable mirror 410 from a first state to a second state (e.g., reflective state to transparent state), the first and second image sensors 404 and 402 may capture images with third and fourth focal distances and fields-of-view. As a result, the configuration and operation of components of the multi-resolution system 400 of the barcode scanner device are able to provide optical zoom capability by changing magnification (focal distances and field-of-views) of the captured images from the first image sensor (S$_1$) 404 and the second image sensor (S$_2$) 402 without mechanical movement.

A plurality of optical components, such as the first optical element (OPT$_{SFL}$) 406 and the second optical element (OPT$_{LFL}$) 408, may be formed by one or more lenses. The first optical element (OPT$_{SFL}$) 406 may be the second optical element (OPT$_{LFL}$) 408 are disposed on the PCB of the multi-resolution system 400 of the item processing system. In some embodiments, the positions of the first optical element (OPT$_{SFL}$) 406 and the second optical element (OPT$_{LFL}$) 408 on the PCB, as depicted in FIG. 4A, may be determined based on the positions of the first image sensor (S$_1$) 402 and the second image sensor (S$_2$) 404, respectively. In some embodiments, the first image sensor (S$_1$) 402 and the second image sensor (S$_2$) 404 may initially be disposed on the PCB, and then based on the locations of the first image sensor (S$_1$) 402 and the second image sensor (S$_2$) 404 on the PCB, the positions for installation of the first optical element (OPT$_{SFL}$) 406 and the second optical element (OPT$_{LFL}$) 408 on the PCB may be determined. The first optical element (OPT$_{SFL}$) 406 and the second optical element (OPT$_{LFL}$) 408 may thereafter be installed at the determined positions of the PCB.

A mirror 412 is an object that reflects light in such a way that, for incident light in some range of wavelengths, the reflected light preserves many or most of the physical characteristics of the original light. Such a reflection is generally called specular reflection. In some embodiments, the mirror 412 may be a planar mirror, which has a flat surface. In some embodiments, the mirror 412 may be a curved mirror used to produce magnified or diminished images to focus light or distort a reflected image. The mirror 412 may be installed on the PCB (or elsewhere within the item processing system) such that a location of the mirror 412 on the PCB with respect other components may allow the mirror 412 to receive and reflect the light collected by the second optical element (OPT$_{LFL}$) 408. In some embodiments, a mirror 412 may be installed on the PCB such that a location of the mirror 412 on the PCB with respect other components may allow the mirror 412 to receive and reflect the light collected by the second optical element (OPT$_{LFL}$) 408 and the first optical element (OPT$_{SFL}$) 406. In some embodiments, a mirror 412 may be installed on the PCB such that a location of the mirror 412 on the PCB with respect other components may allow the mirror 412 to receive and reflect the light collected by the first optical element (OPT$_{SFL}$) 406.

The switchable mirror 410 may correspond to a partially reflective and partially transparent/transparent mirror of a small size, where the transparency and reflectance may be selectably changed based on an electric current or voltage applied thereto. The switchable mirror 410 may be an electro-optically switchable transreflective mirror, and may be formed as a solid-state thin film device made from special liquid crystal material that can be rapidly switched between pure reflection, half-reflection, total transparency, or any other states of reflectance and transparency. A push button or any other manual or automated technique may be utilized to apply and/or change electrical current or voltage being applied to the switchable mirror 410. The switchable mirror 410 may be obtained through the use of a glass with an electro-chromic or liquid crystal coating made by a liquid-crystal technology. In an embodiment, the switchable mirror 410 may have 87% photopic reflectance in reflection state, >87% photopic transmittance in transparent state, or 43% reflectance/transmittance when in the half reflection state. The switchable mirror 410 reflection bandwidth may be tailored from 50 to 1,000 nm and the state-to-state transition time may be nominally 10-100 milliseconds. In other embodiments, the switchable mirror 410 may have other values of photopic reflectance in reflection, other values of photopic transmittance in transparent state, other values of reflectance/transmittance when in the half reflection state, other values of reflection bandwidth, and other values of state-to-state transition time without departing from the scope of the disclosed embodiments.

In some embodiments, the switchable mirror 410 may electronically cause redirection of light from one of the second optical element ($OPT_{LFL}$) 408 or the first optical element ($OPT_{SFL}$) 406 to one of the first image sensor ($S_1$) 402 or the second image sensor ($S_2$) 404. The switchable mirror 410 may be capable of being electronically switched from a reflective state to a transparent state, and vice versa. By electronically switching the switchable mirror 410, the barcode scanner device may be able to provide different electronically selectable states of optical zoom (e.g., four different focal distances or zooms). The switchable mirror 410 allows a controller of the multi-resolution system 400 of the item processing system to select between different focal length paths and fields-of-view while capturing images using the first image sensor ($S_1$) 402 and the second image sensor ($S_2$) 404.

In an embodiment, an input device may be provided that may include a wireless interface for communication with a controller of the multi-resolution system 400 of the item processing system for the electrically switchable transreflective mirror 410. The controller and wireless interface may be mounted on a PCB of the multi-resolution system 400 of the item processing system. In response to applying a certain value of a voltage via the controller to the electrically switchable transreflective mirror 410, the switchable transreflective mirror 410 may be placed in a reflection state, whereby light incident on the electrically switchable transreflective mirror 410 may be reflected. In response to applying a certain value of an electrical voltage or current via the controller to the electrically switchable transreflective mirror 410, the mirror 410 may be switched to a transparent state, whereby light passes though the electrically switchable transreflective mirror 410. The change of the status of the electrically switchable transreflective mirror 410 from a transparent state to a reflective state and vice-versa may be obtained in a pre-determined amount of time upon the application of the electrical voltage or current via the controller. The pre-determined amount of time may be 10 milliseconds or fewer. In other embodiments, any value of pre-determined amount of time may be used without limiting the scope of the disclosed embodiments.

As illustrated in FIG. 4B, the switchable mirror 410 may be arranged to pass optical signals along a first image pathway 414 from the first optical element 406 and a second image pathway 416 from the second optical element 408 when the switchable mirror 410 is operated in the transparent state. As illustrated in FIG. 4C, the switchable mirror 410 may be arranged on the PCB of the multi-resolution system 400 of the item processing system to reflect optical signals along a third image pathway 418 and a fourth image pathway 420 when the switchable mirror 410 is operated in the reflection state. As shown, the switchable mirror 410 is positioned such that center-lines 422 and 424 of the optical signals via each of the first and second optical elements 406 and 408 have an intersection 426 at the switchable mirror 410. In an alternative embodiment, the intersection 426 of the optical paths 409 may be offset when incident the switchable mirror 410, but still be applied to the image sensors 402 and 404, albeit in different locations, when reflected or passed through the switchable mirror.

The first image sensor ($S_1$) 404 and the second image sensor ($S_2$) 402 may correspond to a global shutter sensor device that is simultaneously exposed to capture an image or a rolling basis, such as a CMOS imager with a rolling shutter. Other embodiments can use a mechanical shutter in place of a rolling reset technique to capture stop-motion images of a target object. The mechanical shutter may include a flexible member attached to a shutter that blocks light from being incident on a CMOS image sensor or other suitable image sensor.

Figure 9:
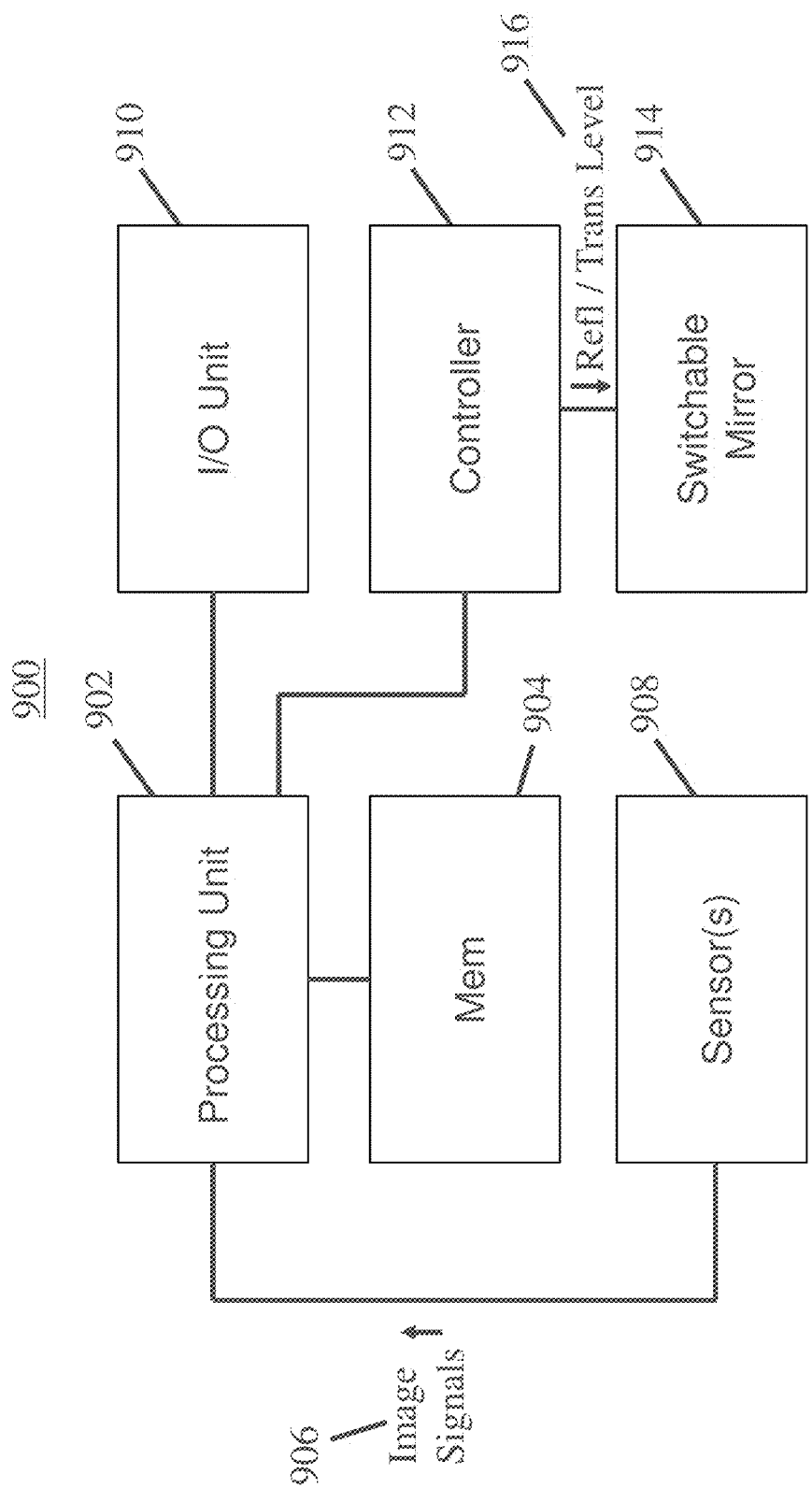
FIG. 9 is a schematic of illustrative electronics for operating a barcode reader as described herein.

With regard to FIG. 9, a schematic of illustrative electronics 900 for operating a barcode reader as described herein is shown. The electronics 900 include a processing unit 902 that may execute software for controlling the electronics 900. The processing unit 902 may be formed of one or more processors, including a general processor, signal processor, image processor, or any other processor, as understood in the art. In an embodiment, the processing unit 902 is in communication with a memory 904 that may be used to store software and/or data, such as image data generated from images signals 906 that may be generated by image sensor(s) 908. It should be understood that the image sensor(s) 908 may be formed of a variety of different sensor technologies. The processing unit 902 may further be in communication with an input/output (I/O) unit that may be used to communicate data, such as image data, over a communications network. The processing unit 902 may be in communication with a controller 912 that is used to drive a switchable mirror 914. The controller 912 may be configured to perform logical operations or be an electronic driver circuit used to drive the switchable mirror with a reflection or transparent level signal 916 that applies a certain voltage or current level to the switchable mirror 914 to cause the switchable mirror 914 to be in a reflection or transparent state. It should be understood that a variety of alternative configurations may be utilized to perform the same or similar functions, as described herein.

With further reference to FIGS. 4A-4C, though the size and specifications of the first image sensor ($S_1$) 404 and the second image sensor ($S_2$) 402 may depend on a particular design and configuration of the multi-resolution system 400 of the item processing system, one embodiment of first image sensor ($S_1$) 404 and the second image sensor ($S_2$) 402 is a CMOS imager with a resolution between 400×400-1280×1024 pixels. One illustrative megapixel (MP) first image sensor ($S_1$) 402 is a model AR0134 image sensor device available from On Semiconductor and the second image sensor ($S_2$) 404 is a model OV9282 image sensor device available from OmniVision Technologies, Inc. The first image sensor ($S_1$) 402 and the second image sensor ($S_2$) 404 may be applicable to a data reader of the item processing system of any of the embodiments herein. However, any other suitable types of imager of various resolutions may be employed without limiting the scope of the disclosed embodiments.

In some embodiments, the first image sensor ($S_1$) 402 and the second image sensor ($S_2$) 404 may have an active operating area within a total operating area of the multi-resolution system 400 of the item processing system. A size of the active operating area of the first image sensor ($S_1$) 402 and a size of the active operating area of the second image sensor ($S_2$) 404 may be small such that the total operating area of the multi-resolution system 400 of the item processing system is small, and in so doing resulting in a compact size of the item processing device. In some embodiments, the active operating area of the first image sensor ($S_1$) 402 may be different with respect to the active operating area of the second image sensor ($S_2$) 404 within the total operating area of the multi-resolution system 400 of the item processing system in order to achieve a zoom effect capability during the operation of the multi-resolution system 400 of the item processing system.

In some embodiments, the first image sensor ($S_1$) 402 and the second image sensor ($S_2$) 404 may have pixels. In some embodiments, the first image sensor ($S_1$) 402 and the second image sensor ($S_2$) 404 may have the same number of pixels, such as 1 megapixels (MPs). In some embodiments, the first image sensor ($S_1$) 402 and the second image sensor ($S_2$) 404 have the same number of pixels, but be configured with different sized pixels. In some embodiments, the first image sensor ($S_1$) 402 and the second image sensor ($S_2$) 404 may have a different numbers of pixels and be configured with the same or different sized pixels.

In some embodiments, the first image sensor ($S_1$) 402 and the second image sensor ($S_2$) 404 may have a different format size. In an embodiment, a format size of the first image sensor ($S_1$) 402 is greater than a format size of the second image sensor ($S_2$) 404. In some other embodiments, a format size of the first image sensor ($S_1$) 402 is smaller than a format size of the second image sensor ($S_2$) 404 without limiting the scope of the disclosed embodiments. In some other embodiments, a format size of the first image sensor ($S_1$) 402 is substantially similar to a format size of the second image sensor ($S_2$) 404 without limiting the scope of the disclosed embodiments.

Figure 5A:
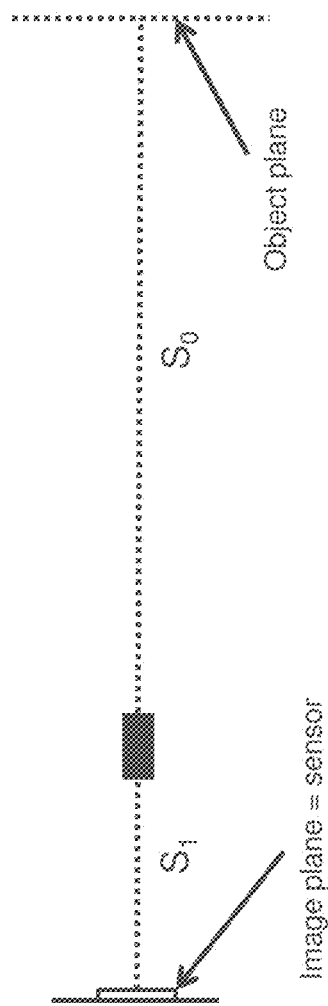
FIG. 5A is an illustration of an illustrative formula describing a behavior of a multi-resolution system of an item processing system, according to an illustrative embodiment.
Figure 5B:
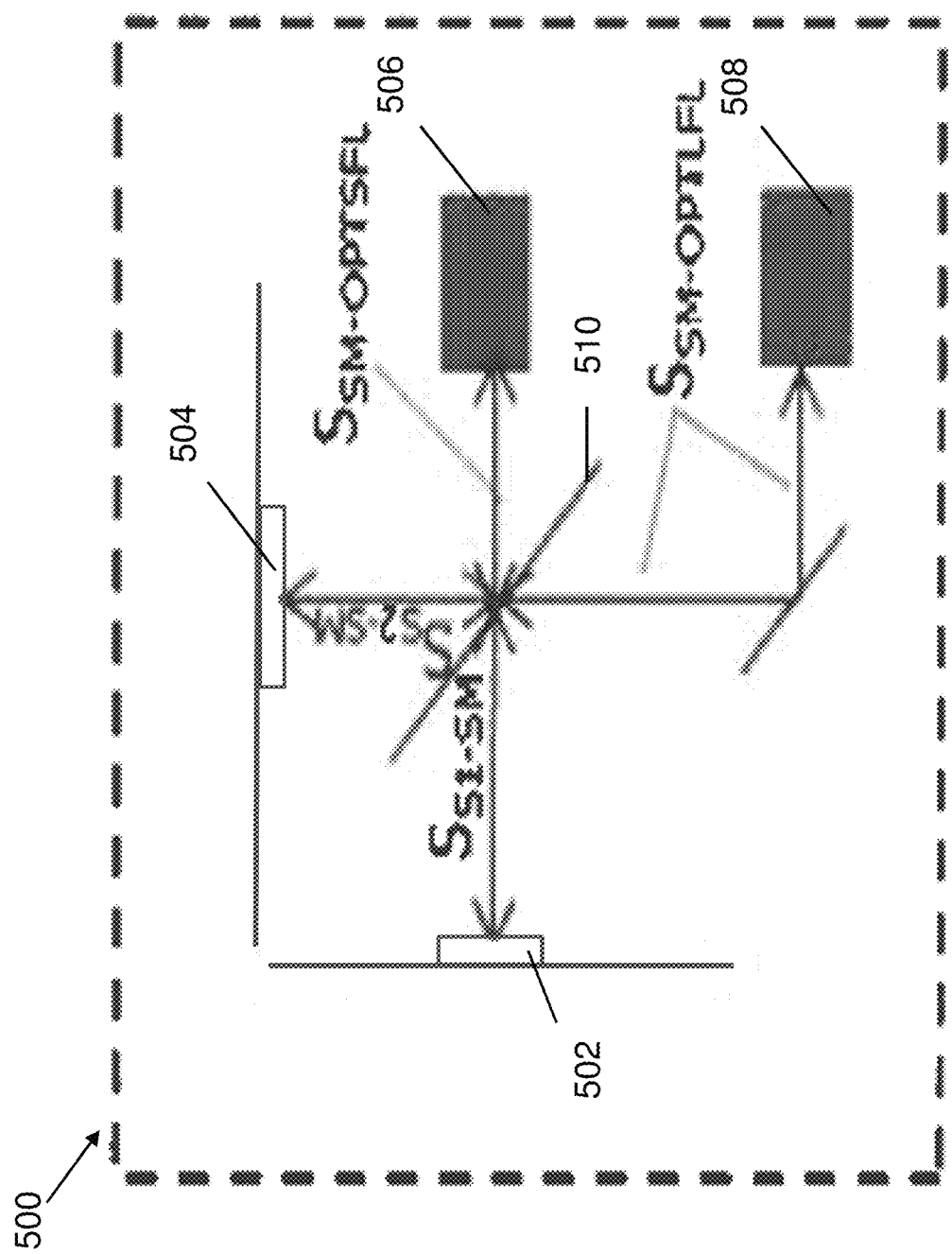
FIG. 5B is an illustration of a formula describing a behavior of a multi-resolution system of an item processing system, according to an illustrative embodiment.

FIGS. 5A-5B are illustrations of components show a physical relationship of parameters (FIG. 5A) of a formula describing a configuration and behavior of a multi-resolution system 500 (FIG. 5B) of an item processing system. In some embodiments, the item processing system may be a handheld barcode scanner and/or a fixed barcode scanner. In some embodiments, the item processing system may be a direct part marking (DPM) barcode scanner equipped with the multi-resolution system capable of reading barcodes that are etched or imprinted directly into the surface of object materials, such as plastic and metal. FIG. 5A-5B will further be explained in conjunction with FIG. 4A-4C.

In some embodiments, a formula describing the behavior of the multi-resolution system 500 of the barcode scanner defines a relationship of a distance between an object being read by the barcode scanner, image sensors ($S_1$ and $S_2$) 502, 504, and optical elements 506, 508 of the barcode scanner. The formula may be used to calculate a field-of-view of the barcode scanner in different operating conditions, such as a transparent and reflective operating conditions of a switchable mirror 510 of the multi-resolution system 500 of the barcode scanner. In some embodiments, in order to calculate the field-of-view of the multi-resolution system 500 of the barcode scanner in the different operating conditions, such as a transparent and reflective operating condition of a switchable mirror 510 of the multi-resolution system 500, the following formula in equation 1 may be utilized.

$$1/S_i + 1/S_o = 1/f \quad \text{(eqn. 1)}.$$

where $S_i$ represents a distance between image planes of the image sensors 502, 504 to the respective optical elements 506, 508, $S_o$ represents a distance between focal planes of the optical elements 506, 508 to an object in a scene, and f represents a focal length of the barcode scanner as computed in equation 1.

In some embodiments, a minimum field-of-view ($FOV_{min}$), a maximum field-of-view ($FOV_{max}$) and four different focal plane distances ($S_{o1}$, $S_{o2}$, $S_{o3}$ and $S_{o4}$) of the barcode scanner may be calculated using the following equations 2-7:

$$1/(S_{s1-sm}+S_{sm-OPTLFL})+1/S_{o1}=1/f_{OPTLFL} \quad \text{(eqn. 2)}.$$

$$1/(S_{s1-sm}+S_{sm-OPTLFL})+1/S_{o2}=1/f_{OPTLFL} \quad \text{(eqn. 3)}.$$

$$1/(S_{s2-sm}+S_{sm-OPTLFL})+1/S_{o3}=1/f_{OPTLFL} \quad \text{(eqn. 4)}.$$

$$1/(S_{s2-sm}+S_{sm-OPTLFL})+1/S_{o4}=1/f_{OPTLFL} \quad \text{(eqn. 5)}.$$

$$\tan(FOV_{min}/2)=(S_2(HF)/2)/(S_{s2-sm}+S_{sm-OPTLFL}) \quad \text{(eqn. 6)}.$$

$$\tan(FOV_{min}/2)=(S_1(HF)/2)/(S_{s1-sm}+S_{sm-OPTLFL}) \quad \text{(eqn. 7)}.$$

where $S_1(HF)$ and $S_2(HF)$ represent horizontal sizes of image sensors $S_1$ and $S_2$ 502, 504, respectively; $S_{s1-sm}$, $S_{sm-OPTLFL}$, $S_{s2-sm}$ and $S_{sm-OPTLFL}$ represent distances between image sensors $S_1$ and $S_2$ 502, 504, respectively and optical components $OPT_{LFL}$ and $OPT_{SFL}$ 506, 508, respectively, which are illustrated in FIG. 5B, and $f_{OPTLFL}$ and $f_{OPTSFL}$ represent focal lengths of optical elements $OPT_{LFL}$ and $OPT_{SFL}$ 506, 508, respectively.

In some embodiments, two tangential intermediate field-of-views ($FOV_{int1}$ and $FOV_{int2}$) of the multi-resolution system of the barcode scanner may be calculated by a formula in following equations 8 and 9:

$$\tan(FOV_{int1}/2)=(S_2(HF)/2)/(S_{s2-sm}+S_{sm-OPTSFL}) \quad \text{(eqn. 8)}.$$

$$\tan(FOV_{int2}/2)=(S_1(HF)/2)/(S_{s1-sm}+S_{sm-OPTLFL}) \quad \text{(eqn. 9)}.$$

In the formula of the equations 8-9, $S_1(HF)$ and $S_2(HF)$ represent horizontal sizes of image sensors $S_1$ and $S_2$ 502, 504 respectively, and $S_{s1-sm}$, $S_{sm-OPTLFL}$, $S_{s2-sm}$ and $S_{sm-OPTLFL}$ represent distances between image sensors $S_1$ and $S_2$ 502, 504 respectively and optical components $OPT_{LFL}$ and $OPT_{SFL}$ 506, 508 respectively, which are illustrated in FIG. 5B.

FIGS. 6A-6B are illustrations of a first group 600 and a second group 602, respectively, of optical components of a multi-resolution system of an item processing system. FIGS. 6A-6B will be explained in conjunction with FIG. 4A-5B. In some embodiments, the item processing system may be a handheld barcode scanner and/or a fixed barcode scanner. In some embodiments, the item processing system may be a direct part marking (DPM) barcode scanner equipped with the multi-resolution system capable of reading barcodes that are etched or imprinted directly into the surface of object materials, such as plastic and metal.

Figure 6C:
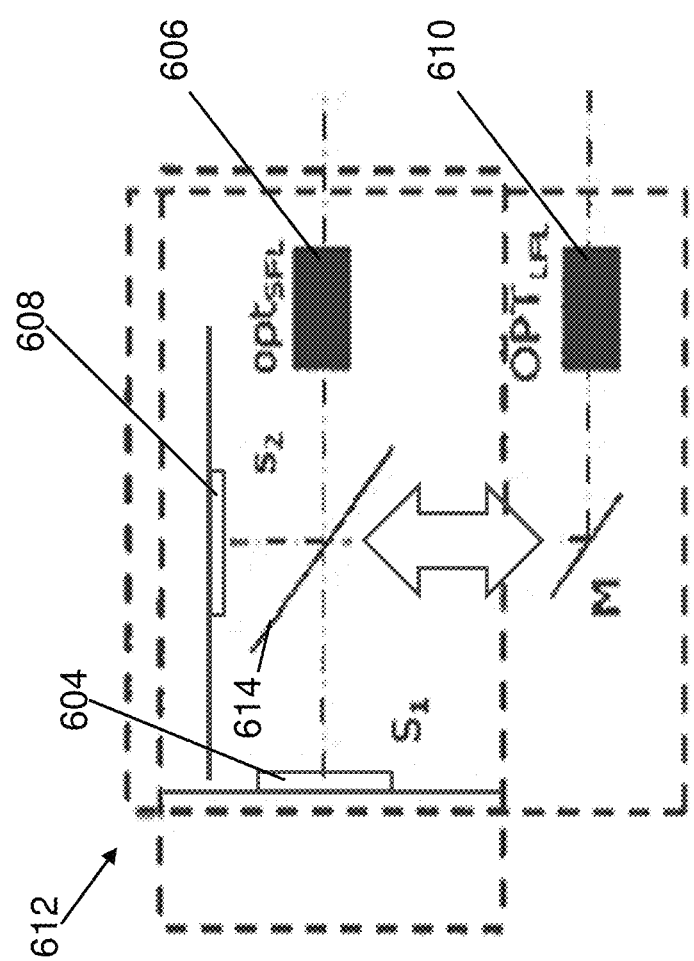
FIG. 6C is an illustration of a linking of the first group of components and the second group of components of FIGS. 6A and 6B aligned to form a multi-resolution system of an item processing system, according to an illustrative embodiment.

A mechanical architecture of a first group 600 of optical components of the multi-resolution system of the barcode scanner, as illustrated in FIG. 6A, may include a first sensor ($S_1$) 604 and a first optical element 606, such as a lens with a small or first focal length ($OPT_{SFL}$). A mechanical architecture of a second group 602 of optical components of the multi-resolution system of the barcode scanner, as illustrated in FIG. 6B, may include a second sensor ($S_2$) 608 and a second optical element 610, such as a lens with a large or second focal length ($OPT_{LFL}$). In some embodiments, the optical components of the first group 600 and the second group 602 of the barcode scanner may be linked to a center of a switchable mirror 614 while the optical components of the first group 600 and the second group 602 may be arranged with respect to their axes to form an operational multi-resolution system 612 of the barcode scanner, as illustrated in FIG. 6C. The switchable mirror 614 may be configured to operate in a transparent state or a reflective state depending upon a value of an electrical voltage or current applied on the switchable mirror 614 from a controller of the barcode scanner.

In some embodiments, a calibration of the multi-resolution system of the barcode scanner may be performed by independently adjusting distances of the optical components of the first group 600 and the second group 602 of the multi-resolution system 612 of the barcode scanner. For instance, the calibration of the multi-resolution system of the barcode scanner may be performed by adjusting four distances of the optical components of the first group 600 and the second group 602 of the multi-resolution system 612, namely, Ss1-sm, $S_{sm\text{-}OPTLFL}$, Ss2-sm and $S_{sm\text{-}OPTSFL}$ with respect to a center of the first and the second sensors 604, 608 and the switchable mirror 614 of the barcode scanner that may be disposed at an intersection of optical paths created by the first and second optical elements 606 and 610.

In some embodiments, during execution of the calibration process of the multi-resolution system 612 of the barcode scanner, in a first step of the calibration process, focal lengths Ss1-sm, $S_{sm\text{-}OPTLFL}$, Ss2-sm and $S_{sm\text{-}OPTSFL}$ may be established to obtain focal plane distances $S_{O1}$ and $S_{O4}$. In a second step of the calibration process, relative positions of the sensors 604, 608 and the optical elements 606, 610 with respect to the switchable mirror 614 may be established to adjust Ss1-sm and Ss2-sm, and consequently obtain focal plane distances $S_{O2}$ and $S_{O3}$.

In some embodiments, during execution of the calibration process of the multi-resolution system 612 of the barcode scanner, in a first step of the calibration process, distances of the components of the first group 600 and the second group 602 may be adjusted independently. For instance, a distance between the first sensor 604 and the first optical element 604 of the first group 600 and a distance between the second sensor 608 and the second optical element 610 of the second group 602 respectively may be adjusted to determine a condition where a focal distance is such that the switchable mirror 614 is in a transparent condition. In a next step of the calibration process, the first group 600 and the second group 602 are positioned in relation with respect to the switchable mirror 614. In some embodiments, initially, a focal distance of the first optical element 604 is adjusted with respect to the first sensor 604 in the first group 600 and the second optical element 610 is adjusted with respect to the second sensor 608 in the second group 602, and then the positions of the first group 600 and the second group 602 are moved with respect to the switchable mirror 614 to adjust the relation of the four components (sensors 604, 608 and the optical elements 606, 610) of the first group 600 and the second group 602.

Figure 7:
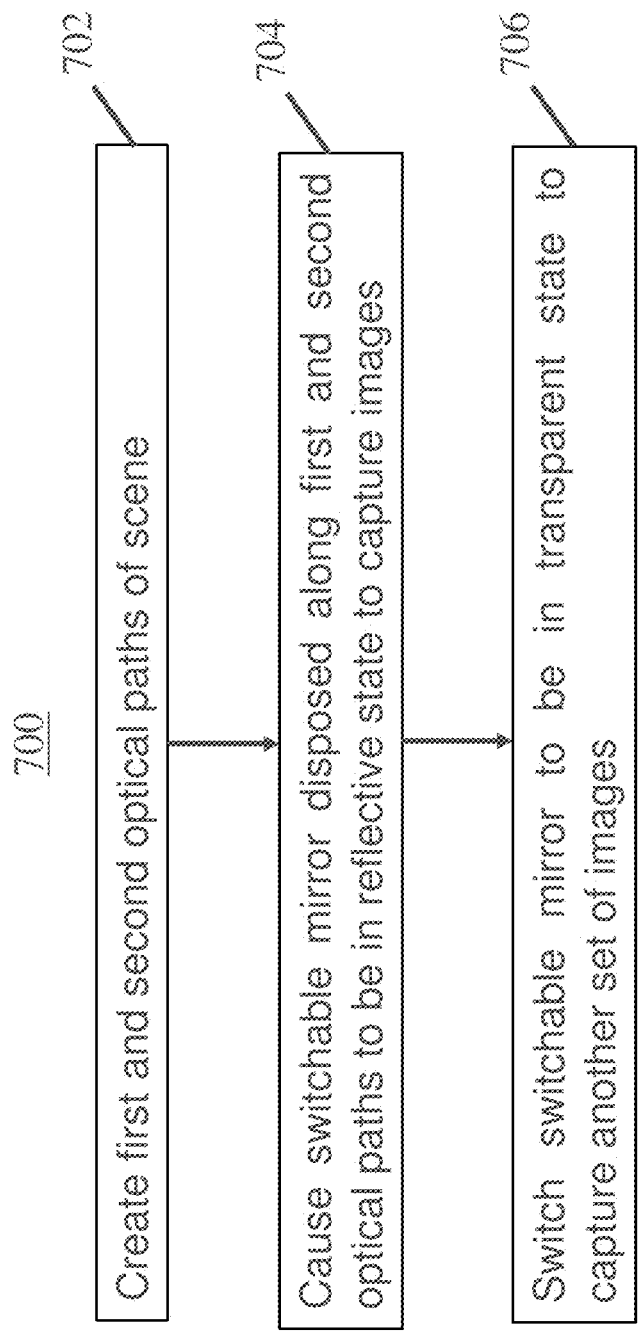
FIG. 7 is a flow diagram of an illustrative process for imaging a scene, according to an illustrative embodiment.

FIG. 7 is a flow diagram of an illustrative process 700 for imaging a scene of an object being read by an image processing device. At step 702, a plurality of optical components of the image processing device (such as a barcode scanner device configured for reading machine-readable indicia captured in the scene) may create first and second optical paths of the scene of the object. In some embodiments, in order to create the first and second optical paths of the scene, the first and second optical paths may be created such that the first and second optical paths are incident on a switchable mirror at a location where the first and second optical paths intersect. The switchable mirror may be disposed along the first and second optical paths. In some embodiments, in order to create the first and second optical paths of the scene, a first optical signal may be caused to be incident on a first side of the switchable mirror and a second optical signal is caused to be incident on a second side of the switchable mirror. Furthermore, the second optical signal may be reflected to be incident onto the second side of the switchable mirror.

At step 704, a switchable mirror disposed along the first and second optical paths is caused to be in a reflective state upon application of a voltage from a controller of the barcode scanner device. In the reflective state of the switchable mirror of the barcode scanner device, a first image sensor may capture images at a first focal distance and with a first field-of-view. A second image sensor may capture the images at a second focal distance and with a second field-of-view.

In some embodiments, the first and the second image sensors capturing the images with the first and the second focal distances may be configured such that the first and the second image sensors are perpendicularly aligned with one another. In an alternative embodiment, the first and second image sensors may be aligned in a non-perpendicular orientation. In some embodiments, the first and the second image sensors capturing the images with the first and second focal distances may be configured to capture the images with the first and second focal distances such that the first and second focal distances are different from one another.

In some embodiments, the first and the second image sensors capturing the images with the first and the second focal distances may be configured such that while capturing the images a distance between the switchable mirror and the first image sensor is different than a distance between the switchable mirror and the second image sensor. In some embodiments, a distance between the switchable mirror and the first image sensor is more than a distance between the switchable mirror and the second image sensor. In some embodiments, a distance between the switchable mirror and the first image sensor is less than a distance between the switchable mirror and the second image sensor. In some embodiments, a distance between the switchable mirror and the first image sensor may be equal to a distance between the switchable mirror and the second image sensor.

In some embodiments, the first and the second image sensors capturing the images with the first and the second focal distances may be configured such that the first and the second image sensors captures the images of different format sizes. In some embodiments, the first and the second image sensors capturing the images with the first and the second focal distances may be configured such that the first image sensor may be configured to capture the image of a greater format size than the image captured by the second image sensor. In some embodiments, the first and the second image sensors capturing the images with the first and the second focal distances may be configured such that the first image sensor may be configured to capture the image of a smaller format size than the image captured by the second image sensor.

At step 706, a switchable mirror disposed along the first and the second optical paths is caused to be in transparent state upon application of a voltage from a controller of the barcode scanner device. In the transparent state of the switchable mirror of the barcode scanner device, a first image sensor may capture images at a third focal distance and with a third field-of-view, and a second image sensor may capture the images at a fourth focal distance and with a fourth field-of-view.

In some embodiments, the first and the second image sensors capturing the images with the third and the fourth focal distances may be configured to capture the images with the third and fourth focal distances such that the third and the fourth focal distances are different from one another. In some embodiments, the first and the second image sensors capturing the images with the third and the fourth focal distances may be configured such that the first and the second image sensors captures the images of different format sizes. In some embodiments, the first and the second image sensors capturing the images with the third and the fourth focal distances may be configured such that the first image sensor may be configured to capture the image of a greater format size than the image captured by the second image sensor. In some embodiments, the first and the second image sensors capturing the images with the third and the fourth focal distances may be configured such that the first image sensor may be configured to capture the image of a smaller format size than the image captured by the second image sensor.

Figure 8:
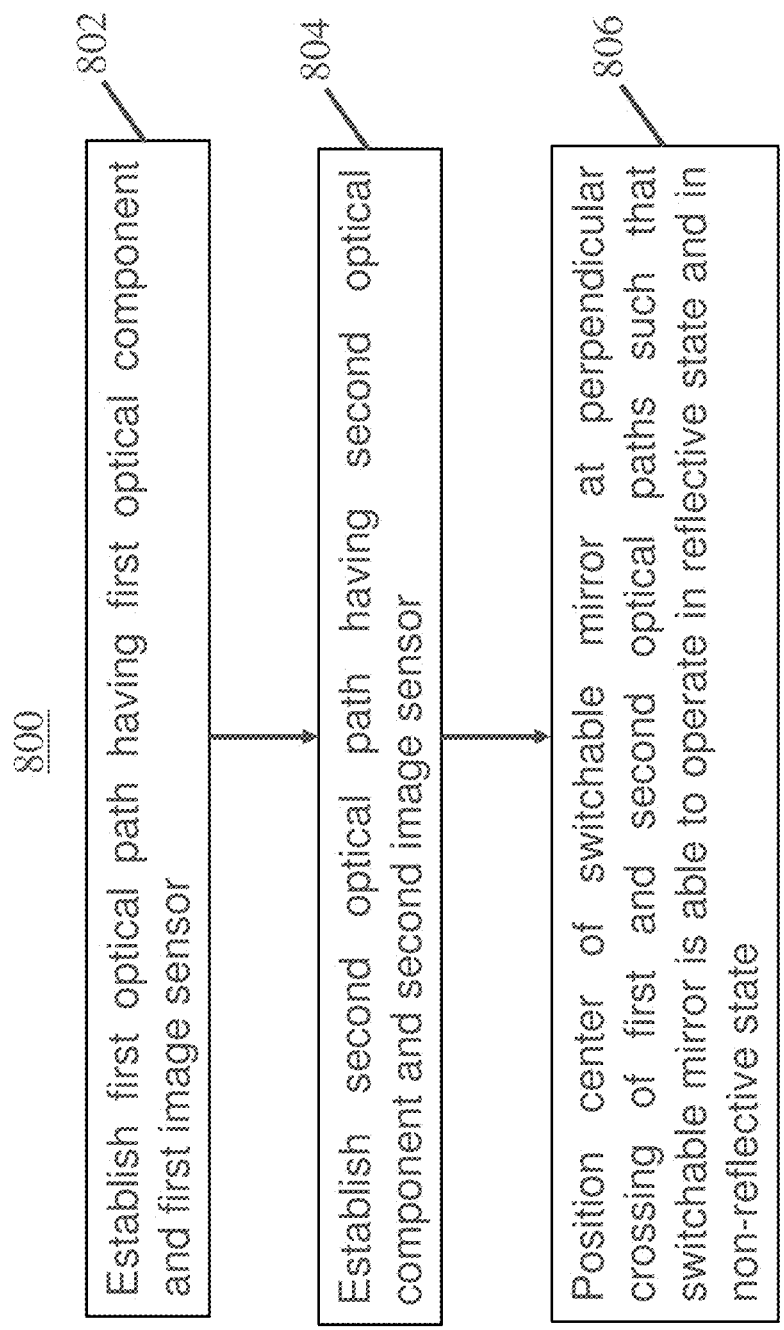
FIG. 8 is a flow diagram of an illustrative process for aligning an imaging system, according to an illustrative embodiment.

FIG. 8 is a flow diagram of an illustrative process 800 for aligning an imaging system such as a barcode scanner device configured for reading machine-readable indicia captured in a scene of an object. At step 802, establish a first optical path inclusive of one first optical component and a first image sensor. In some embodiments, a controller of the barcode scanner device may receive one or more instructions to establish the first optical path inclusive of the one first optical component and the first image sensor. The controller upon receiving the one or more instructions may then establish the first optical path inclusive of the one first optical component and the first image sensor.

At step 804, establish a second optical path inclusive of one second optical component and a second image sensor being perpendicularly aligned to the first image sensor. In some embodiments, a controller of the barcode scanner device may receive one or more instructions to establish the second optical path inclusive of the one second optical component and the second image sensor. The controller upon receiving the one or more instructions may then establish the second optical path inclusive of the one second optical component and the second image sensor. In some embodiments, the first and second optical paths may cross perpendicularly prior to being incident on the first and second image sensors. In some embodiments, the first and second optical paths may not cross perpendicularly prior to being incident on the first and second image sensors.

At step 806, position a center of a switchable mirror at the perpendicular crossing of the first and second optical paths such that the switchable mirror may operate in a reflective state and in a non-reflective state (such as a transparent state) upon application of a voltage of a certain value from a controller circuit of the barcode scanner device. When the switchable mirror is operating in a reflective state upon application of the voltage from the controller of the barcode scanner device, a first optical signal traversing the first optical path is incident on the first image sensor and a second optical signal traversing the second optical path is incident on the second image sensor. When the switchable mirror is operating in a non-reflective state (such as a transparent state) upon application of the voltage from the controller of the barcode scanner device, the first optical signal traversing the first optical path is incident on the second image sensor and the second optical signal traversing the second optical path is incident on the first image sensor.

Although the configurations and processes described herein are being related to a barcode scanner device configured for reading machine-readable indicia captured in a scene of an object, it should be understood that the principles may alternatively be utilized for non-barcode scanner applications. For example, other devices that may require an improved depth-of-view may also utilize a camera module based on switchable mirror technology in order to have an ability to control the depth-of-field of said device.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed:

1. An imaging system, comprising:
    a housing;
    a plurality of optical components disposed within the housing, and configured to create first and second optical paths of a scene;
    a plurality of image sensors; and
    a switchable mirror disposed along the first and second optical paths, the switchable mirror being in a reflective state to cause (i) a first image sensor to capture images at a first focal distance and a first field-of-view, and (ii) a second image sensor to capture images at a second focal distance and second field-of-view, the switchable mirror being in a transparent state to cause (iii) the first image sensor to capture images at a third focal distance and third field-of-view and (iv) the second image sensor to capture images at a fourth focal distance and fourth field-of-view.

2. The system according to claim 1, wherein the switchable mirror is disposed at an intersection of the first and second optical paths.

3. The system according to claim 2, wherein the switchable mirror includes a first side and a second side, the switchable mirror positioned such that the first optical signal is incident the first side and the second optical signal is incident the second side.

4. The system according to claim 3, further comprising a mirror disposed to reflect the second optical signal to be incident on to the second side of the switchable mirror.

5. The system according to claim 1, wherein the first and second image sensors have different pixel sizes.

6. The system according to claim 1, wherein the optical components include at least one first optical component with a first focal length and at least one second optical component with a second focal length, the first and second focal lengths being different from one another.

7. The system according to claim 1, wherein the switchable mirror includes an electrochromic or liquid crystal coating.

8. The system according to claim 1, wherein a distance between the switchable mirror and the first image sensor is different than a distance between the switchable mirror and the second image sensor.

9. The system according to claim 1, further comprising a structure including a first wall and a second wall onto which the first and second image sensors are respectively affixed, wherein the first and second walls are perpendicular to one another.

10. The system according to claim 1, further comprising a processing unit in communication with the image sensors, and configured to read machine-readable indicia.

11. A method of imaging a scene, comprising:
    creating first and second optical paths of the scene; and
    causing a switchable mirror disposed along the first and second optical paths to be in a reflective state (i) to capture images at a first focal distance and with a first field-of-view, and (ii) to capture images at a second focal distance and with a second field-of-view; and
    switching the switchable mirror to be in a transparent state (iii) to capture images at a third focal distance and with a third field-of-view and (iv) to capture images at a fourth focal distance and with forth a fourth field-of-view.

12. The method according to claim 11, wherein creating the first and second optical paths of the scene includes creating the first and second optical paths to be incident the switchable mirror at a location where the first and second optical paths intersect.

13. The method according to claim 12, wherein creating the first and second optical paths of the scene include causing a first optical signal to be incident a first side of the switchable mirror and causing a second optical signal to be incident a second side of the switchable mirror.

14. The method according to claim 13, further comprising reflecting the second optical signal to be incident onto the second side of the switchable mirror.

15. The method according to claim 11, wherein capturing the first and second images includes capturing the first and second images at different pixel sizes.

16. The method according to claim 11, wherein capturing the images with the first and second focal distances includes capturing the images with the first and second focal distances being different from one another.

17. The method according to claim 11, wherein capturing the images includes capturing the images a distance between the switchable mirror and a first image sensor is different than a distance between the switchable mirror and a second image sensor.

18. The method according to claim 11, wherein capturing the images includes capturing the images using image sensors that are perpendicular aligned with one another.

19. The method according to claim 11, further comprising reading machine-readable indicia captured in the scene.

* * * * *